United States Patent [19]

Springer et al.

[11] Patent Number: 4,577,435
[45] Date of Patent: Mar. 25, 1986

[54] MICRO-CLIMATE TEMPERATURE CONTROL APPARATUS

[76] Inventors: Edward A. Springer; Ronald D. Smith, both of 611 Mountain View Ave., Petaluma, Calif. 94952

[21] Appl. No.: 545,072

[22] Filed: Oct. 24, 1983

Related U.S. Application Data

[63] Continuation-in-part of Ser. No. 293,681, Aug. 17, 1981, Pat. No. 4,411,101.

[51] Int. Cl.$^4$ ............................................. A01G 13/00
[52] U.S. Cl. ............................................. 47/2; 248/68.1
[58] Field of Search ................. 47/2; 248/68.1, 74.1; 24/336–339

[56] References Cited

U.S. PATENT DOCUMENTS

| | | | |
|---|---|---|---|
| 3,387,343 | 6/1968 | Fitz-Gerald | 248/68.1 X |
| 3,470,943 | 10/1969 | Van Huisen | |
| 3,521,699 | 7/1970 | Van Huisen | |
| 3,727,345 | 4/1973 | Smith | |
| 3,863,710 | 2/1975 | Masters | |
| 3,893,507 | 7/1975 | MacCracken et al. | |
| 3,976,855 | 8/1976 | Altmann et al. | 248/68.1 X |
| 4,029,277 | 6/1977 | Bulanda | 248/74.1 |
| 4,112,921 | 9/1978 | MacCracken | |
| 4,114,241 | 9/1978 | Bisping | 248/68.1 X |
| 4,159,595 | 7/1979 | Dalle et al. | |
| 4,270,596 | 6/1981 | Zinn et al. | |
| 4,411,101 | 10/1983 | Springer et al. | 47/2 |

FOREIGN PATENT DOCUMENTS 2060341  5/1981  United Kingdom .

Primary Examiner—Robert E. Bagwill
Attorney, Agent, or Firm—Manfred M. Warren; Robert B. Chickering; Glen R. Grunewald

[57] ABSTRACT

A micro-climate temperature control apparatus for heating and/or cooling of plants is disclosed. The apparatus includes an array of flexible, individually movable plastic tubes which are positioned under the plant root systems and/or used as space heating and cooling elements proximate the plant foliage. The tubes are preferably formed of EPDM plastic enabling their use with high-temperature water sources, as well as conventional sources. A notched tube securement strip is also disclosed which enables arrangement and securement of the individually movable tubes in a wide variety of configurations and also facilitates the use of relatively short input and outlet distribution manifolds.

10 Claims, 6 Drawing Figures

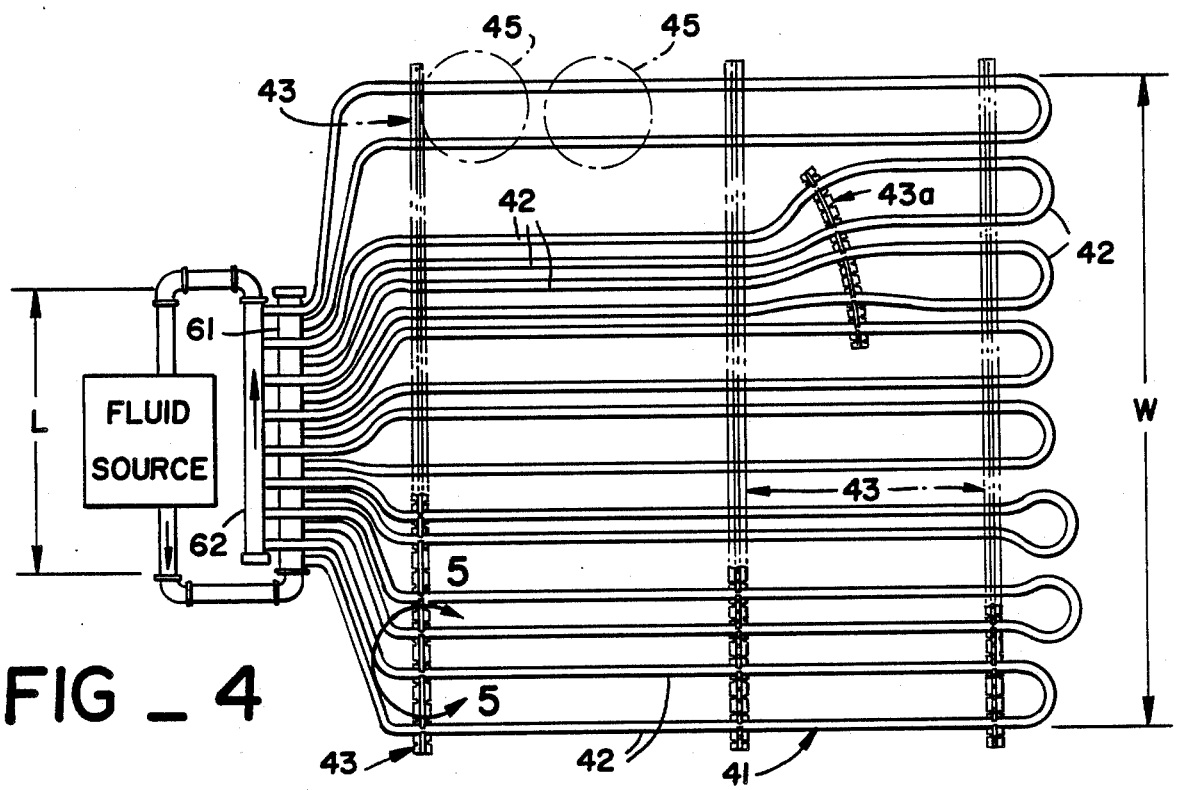
FIG_4
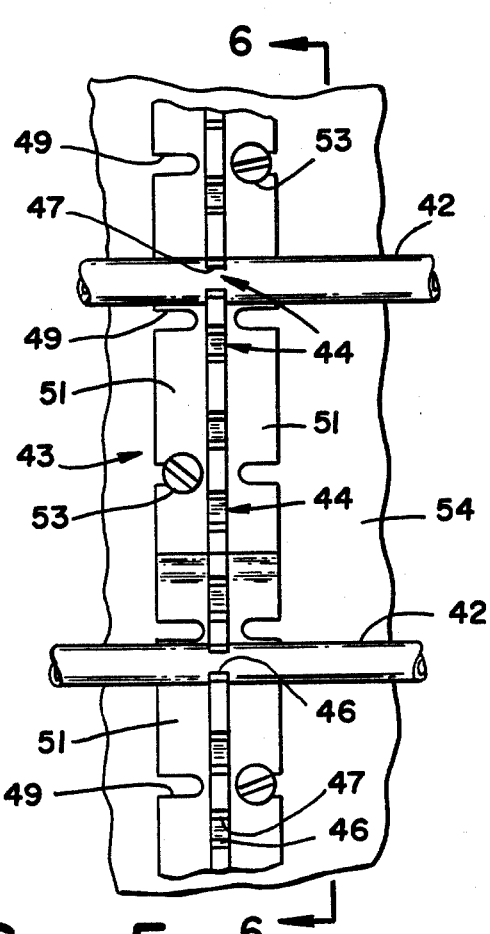
FIG_5
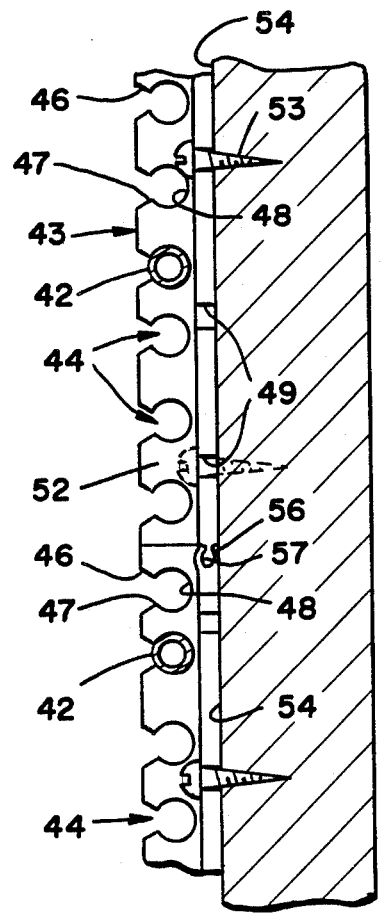
FIG_6

MICRO-CLIMATE TEMPERATURE CONTROL APPARATUS

RELATED APPLICATION

This application is a continuation-in-part application based upon copending application Ser. No. 293,681 filed August 17, 1981 U.S. Pat. No. 4,411,101, 10-25-85 and entitled "APPARATUS AND METHOD FOR HEATING THE ROOT ZONE OF PLANTS."

BACKGROUND OF THE INVENTION

As the cost of energy increases, more pressure is being brought to bear on energy efficiency in connection with the growing of plants in greenhouses or other enclosed and energy-controlled environments. It is now widely recognized in the industry that one of the most efficient ways of growing plants is to create a micro-climate for the plants, primarily by heating the root zone of the plants, rather than to attempting to control the air temperature around the plants. In some installations it has been even found most advantageous to heat the plant root zone while cooling the foliage. Thus, considerable work has been undertaken recently in connection with water-based heating systems which are installed underneath plant containers or in propagation benches or beds in combination with space heating or cooling apparatus.

Root heating or micro-climate temperature control systems have been found to achieve heat energy savings between about 35% and as much as about 78%, as compared to conventional space heating systems. Prior root heating systems, however, have also been accompanied by a significant increase in the system installation costs, as compared to space heaters.

Typical of the root zone heating apparatus which has previously been marketed is the system marketed under the trademark FLEXITWIN by Calmac Manufacturing Corporaction of Inglewood, N.J. This system is shown in a solar panel in U.S. Pat. No. 4,112,921 but it has also been used as a microclimate heat transfer array for root zone heating. The Calmac system employs pairs of polyethylene tubes, which in fact are not very flexible and which are connected to input and outlet headers for the flow of water at an elevated temperature through the tubes. The tubes are extruded together as a unit with abutting side-by-side channels, and a copper or similar U-shaped fitting is mounted and secured in the far end of the tube to provide a continuous loop. A feature of this system is that the counterflow of heated water in the abutting tubes purportedly evens out or averages out the temperature differences so that at any position along the pair of tubes the temperature is essentially the same. U.S. Pat. No. 3,893,507 also shows a counterflow tubular array used to maintain the temperature in a slab of ice.

Another approach in the prior art has been to employ a mat in which there are a plurality of side-by-side plastic tubes interconnected by a webbing and positioned under the plant root system or zone. U.S. Pat. Nos. 4,159,595 and 4,270,596 are typical of such prior art mats. While substantial energy savings can be attained through use of a mat-type root heating system, the initial cost of the system is undesirably high, and they lack flexibility in accommodating spacing variations between tubes as well as being poorly suited for positioning of selected tubes above the mat to augment space heating.

In recent years another consideration has become more important in connection with greenhouse heating. While greenhouses have the advantage of eliminating transportation costs since they can be located in almost any climate proximate large populations, they still have a relatively low priority with regard to the use of conventional energy sources. Thus, oil, gas and liquid petroleum heating units are still in widespread use to heat greenhouses, but there is also considerable pressure to enact laws and codes which would limit or prohibit use of such conventional energy sources as the basis for greenhouse heating systems. Accordingly, the future for greenhouse heating appears to reside in the use of energy sources such as solar energy, solar ponds, geothermal sources, and the like.

Many of these alternate energy sources, however, inherently create new technological problems which have not been addressed or resolved in prior root heating systems. Thus, both solar ponds and geothermal sources produce water at an elevated temperature which includes a very high percentage of corrosive materials. Polyethylene tubing of the type conventionally employed heretofore in greenhouse heating systems is not capable of withstanding the corrosives in geothermal water nor the brine in solar ponds. One way of dealing with the brine from solar ponds or the naturally occurring corrosives in geothermal water is to provide a heat exchanger which is then used to isolate the energy source from the greenhouse heating system. This approach, however, obviously adds to the overall system cost. Copper tube systems will withstand higher temperatures, but they are subject to corrosion, and the cost of such systems is very substantial. High molybdenum content stainless steel will withstand both the temperatures and corrosion, but the cost of providing substantial quantities of tubing out of such a material is prohibitive. U.S. Pat. Nos. 3,470,943 and 3,521,699 are typical of geothermal energy conversion systems.

The efficiency of solar panels diminishes significantly as water temperature increases. Accordingly, relatively large collectors are required to achieve high temperature output water. Thus, a heating system which can employ low temperature solar panel heated water, will effect a significant cost savings in the cost of solar panels.

Another problem which has existed with prior radiant heating systems for plants has been the need to provide auxiliary space heaters for installations in very cold climates. While root zone heating systems are more efficient in producing a unit of plant growth, in northern climates the air temperature in the greenhouse can be so low as to require space heating around the plants, in addition to root zone heating, in order achieve the necessary plant growth. In climates where the outside temperature may be at or below 0° F., for example, some space heating of the greenhouse is required in addition to the root heating.

Most prior systems have used a belt-and-suspenders approach by providing separate space heaters to augment the root heating system. This will, of course, undesirably increase the initial installation cost. Alternatively, rather complex water-gas greenhouse plants and even in open-air applications, see, e.g., U.K. Pat. No. 2,060,341 and U.S. Pat. Nos. 3,727,345 and 3,863,710. In addition to the complexity and inherent high cost of such systems, they lack flexibility in accommodating a wide variety of plant arrays and heating and/or cooling needs.

OBJECTS OF THE INVENTION

Accordingly, it is an object of the present invention to provide an apparatus for micro-climate temperature control in the proximity of plants which is constructed in a manner enabling a substantial savings in the initial investment as well as savings during operation.

Another object of the present invention is to provide an apparatus for heating and/or cooling root systems and for heating and/or cooling the air around the plants when required.

Still a further object of the present invention is to provide an apparatus for root heating of plants which can be employed with non-conventional energy sources such as solar ponds and geothermal energy sources, as well as conventional boilers, refrigeration units, and wood and coal burners.

A further object of the present invention is to provide micro-climate temperature control apparatus which is adaptable to a wide range of applications and operating conditions, is easy to install and maintain, and is highly efficient in its operation.

The micro-climate temperature control apparatus has other objects and features which will become apparent from and are set forth in more detail in the accompany drawing and the following description of the preferred embodiments.

SUMMARY OF THE INVENTION

The apparatus of the present invention for micro-climate temperature control proximate plants includes input manifold means, outlet manifold means and an array of fluid-conveying heat transfer tubes each coupled to the manifolds for flow of heat transfer fluid therethrough. The improvement in the apparatus comprises, briefly, of formation of the tubes as cylindrical tubes from a self-supporting, flexible plastic material with adjacent tubes in the array being relatively spaced apart over substantially the entire lengths of the tubes and the adjacent tubes being independently movable over substantially their entire lengths.

The preferred form of the apparatus includes compact, relatively short distribution manifolds and universally flexible securement strips which can be used to secure the heat transfer tubes spaced apart relation in a wide variety of array configurations. The spacer strips include a plurality of side-by-side openings or notches into which resilient tubes can be pressed fit and retained, subject to easy removal and adjustment or repositioning of the tubes and press-fit securement in new arrays.

DESCRIPTION OF THE DRAWINGS

FIG. 4 is a top plan view of an alternative embodiment of micro-climate temperature control apparatus constructed in accordance with the present invention.

FIG. 5 is an enlarged, fragmentary top plan view taken of the area bounded by line 5—5 in FIG. 4.

FIG. 6 is an end elevational view taken substantially along the plane of line 6—6 in FIG. 5.

DESCRIPTION OF THE PREFERRED EMBODIMENT

Figure 1:
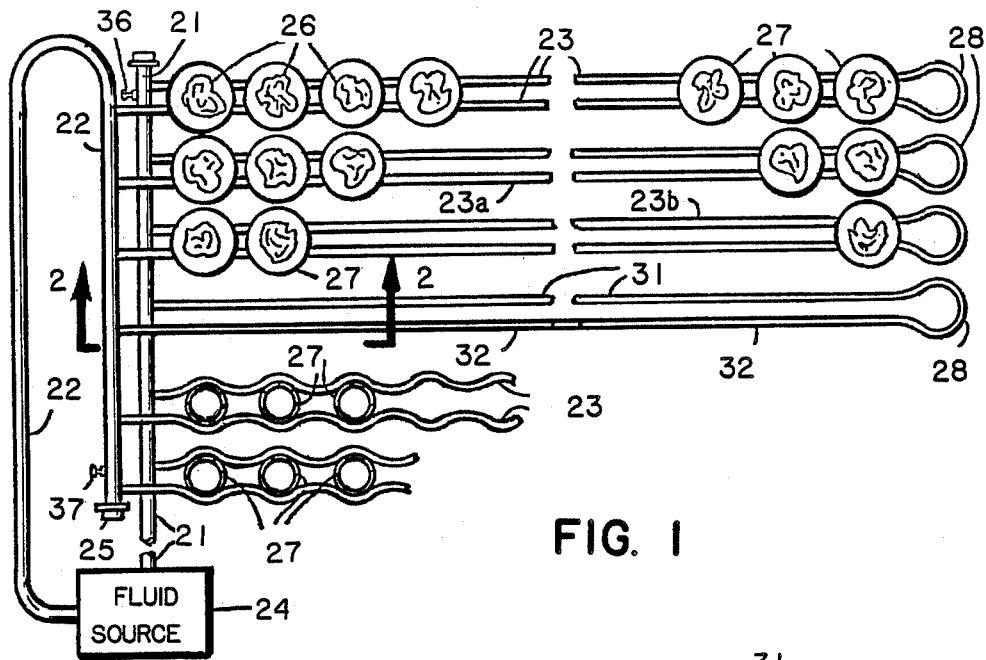
FIG. 1 is a top plan view of a schematic representation of apparatus for a micro-climate temperature control apparatus for plants constructed in accordance with the present invention.
Figure 2:
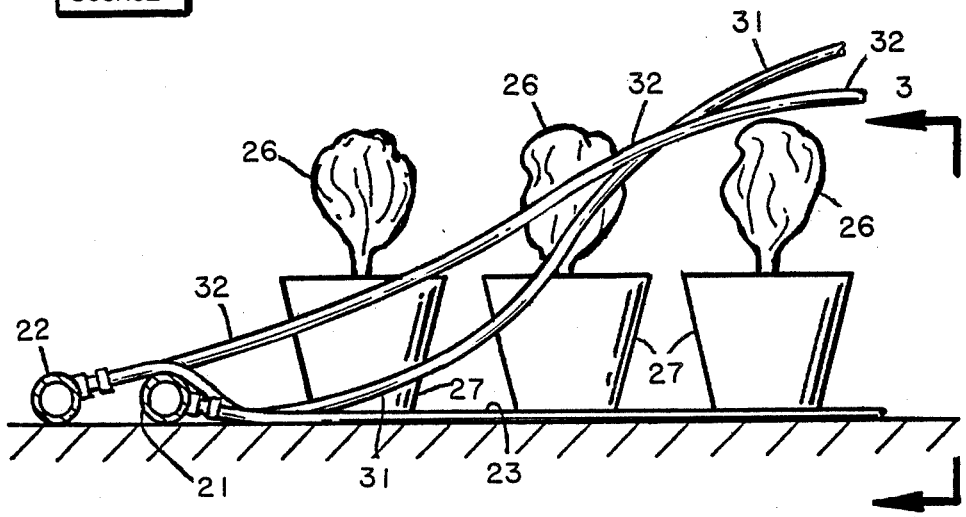
FIG. 2 is an enlarged, fragmentary, side elevational view of the apparatus of FIG. 1 taken substantially along the plane of line 2—2 in FIG. 1.

The micro-climate temperature control apparatus for plants of the present invention has some elements in common with prior art systems. Referring to FIGS. 1 and 2, the apparatus of the present invention can be seen to include input manifold means 21, outlet manifold means 22 and an array of fluid-conveying heat transfer tubes 23 coupled to the manifolds for the flow of a heating or cooling fluid, usually water, through the array. Manifolds 21 and 22 are in turn coupled to a fluid source, generally designated 24, which is schematically represented and would normally include means for urging the fluid through the array (such as a pump, which is not shown).

Superimposed over the array of tubes 23 is a plurality of plants 26 here shown growing in individual growing containers 27, although it will be understood that flats of plants may also be positioned over tubes 23. The apparatus of the present invention is particularly well-suited for root heating of plants grown in containers, but it may also be employed in a propagation bench or bed with the array of tubes 23 buried in the plant growth medium, sand, gravel, concrete or even secured to the underneath side of a wooden bench.

As is true of some prior art systems, it is preferable that manifolds 21 and 22 be provided on one side of the array with tubes 23 being formed as loops which extend from the input manifold along an outwardly extending portion or leg 23a to the far or U-shaped ends 28 of the array and then return by a return portion or leg 23b to the outlet manifold 22. This construction results in a temperature gradient from the inlet manifold to the U-shaped end 28 and a temperature gradient from end 28 to outlet manifold 22 which are in opposite directions. Accordingly, adjacent tubes have temperature gradients in opposite directions, which tends to even out the temperature over the array to which the plant root systems are exposed. In the prior art FLEXITWIN double tube system, the two adjacent tubes are in contact with each other over the entire length so as to cause the temperature along the lengths of the pairs of tubes to be essentially uniform.

It should be understood that it is possible to provide pairs of manifolds on either side of the array so that adjacent tubes will merely extend from one side to the other without looping back. This approach increases the installation cost and has not been found to be necessary. The manifold construction shown in FIGS. 1 and 2 in which return manifold 22 is capped at end 25 and loops back to the source reduces any tendency for the water to "short circuit" or have the majority of the flow pass through the loops 23 closest to source 24.

In the improved heating apparatus of the present invention, however, heat transfer tubes 23 are not in side-by-side abutting relation to each other, and more particularly, adjacent tubes 23 in the array are relatively spaced apart over substantially the entire lengths of the tubes. Still further, the tubes are formed with a cylindrical cross section of a flexible plastic material which is nevertheless self-supporting and preferably capable of supporting plants and containers thereon when filled with fluid. Heat transfer tubes 23 are independently movable over substantially their entire lengths to afford the apparatus of the present invention several important advantages over prior art systems.

While micro-climate systems in which the tubes are in contact with each other over the length thereof or are connected by webbings have the advantage of greater uniformity of heating temperature, they have a substantial cost disadvantage and substantial limitation in the configurations of arrays in which they may be arranged. It has been found that the assumed advantage of uniformity of heating or cooling over the array as a result of contact between adjacent tubes is relatively insignificant as compared to the cost disadvantage of having two tubes where one would suffice. While separation of the tubes does result in some modest uneven heat transfer, that effect is essentially eliminated by the fact that the heat or cooling must travel through containers 27 and the growing medium in which the plant roots are contained before heating or cooling the roots. Accordingly, temperature differentials between the outwardly extending portion 23a and return portion 23b of the tubes tend to be evened out by heat transfer in container 27 and the growing medium.

Figure 3:
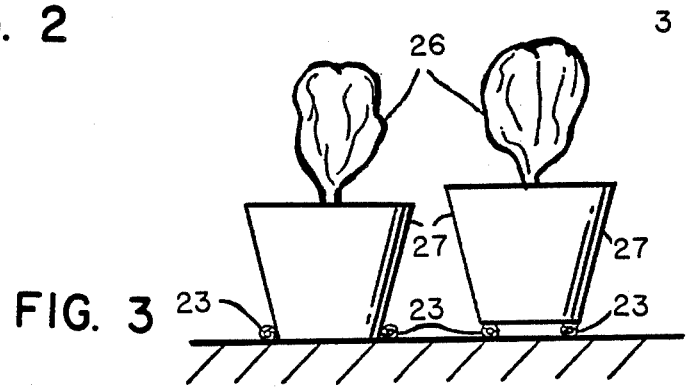
FIG. 3 is a side elevational view taken substantially along the plane of line 3—3 in FIG. 2.

As best may be seen in the right-hand side of FIG. 3 and the top of FIG. 1, it is often advantageous to space tubes 23 at a lateral distance from each other which would support container 27 on the edges of the container. As thus supported, the container will assume a level orientation and heating will be essentially uniform. In a typical installation, water temperature in inlet manifold 21 will be injected into tubes 23 at about 105° F. and will return to manifold 22 at about 90° F. for an array having a length to U-shaped ends 28 of about 100 feet. As will be seen, therefore, even in the worst case, the temperature differential is only about 15°, which differential will easily be evened out by heat transfer through containers 27. The plants, therefore, are not subjected to hot spots through use of the apparatus of the present invention. Moreover, the cost of tubing is essentially cut in half since twin tube systems must place a pair of tubes at each of the edges of containers 27 in order for the pots to be supported in a level orientation on the radient heating tubes.

Another important advantage results from the apparatus of the present invention. In extremely cold climates, it is necessary to provide some space heating of the air around the plants. In warm climates it is conversely sometimes necessary to effect space cooling around the plants. The apparatus of the present invention is particularly well suited to provide this type of space heating or cooling as well as root heating or cooling of the plants. Thus, at least some of tubes 23 in the array can be displaced or elevated relative to the array to provide heating or cooling of the air space proximate the plants. If both root heating and foliage cooling are required, a second array with a low temperature fluid source, manifolds and individually movable tubes can be used for space cooling.

The apparatus of the present invention is suitable for use with fluid sources which are at a wide range of temperatures. Geothermal water, for example, may have a temperature of 190° or higher, while solar panel water may have a temperature of under 100°.

In the apparatus of the present invention the independently movable tubes 23 can be positioned under the plant root systems as shown in FIG. 2 and the right-hand side of FIG. 3, or the tubes may be placed alongside or even above containers 27. When positioned under containers 27 heat transfer by conduction and radiation to the container and growing medium in which the roots are growing is substantial, and heat transfer to the surrounding air relatively insubstantial. This is an approach which is particularly well suited to low-temperature heat or fluid sources 24 and applications in which the surrounding air temperature of the greenhouse is relatively moderate. When high-temperature fluid is being pumped into the system or when the air temperature in the controlled environment would otherwise be relatively cold, the tubes 23 can be positioned alongside containers 27 as shown on the left-hand side of FIG. 3 and the bottom portion of FIG. 1. Thus, tubes 23 are displaced outwardly to allow the pots or containers to be placed between the tubes instead of over the tubes. This will result in conduction and radiant heat transfer to container 27 and the growing medium, but it will also produce greater convection heat transfer to the air surrounding the plants. This greater heat transfer to surrounding air allows higher temperature to be used in the tube array without burning up the plants.

Additionally, the flexible and independently movable tubes can be periodically employed solely as space heaters or coolers. This is accomplished, for example, by lifting or displacing a loop such as the outwardly extending tube portion 31 and the return tube portion 32 upwardly from the array to an elevated position over the plants, as best may be seen in FIG. 2. The loop may be held in an elevated position over the plants by hanger arms (not shown) so that the system is used not only for root temperature control, but as a space temperature control device. The loops used for space temperature control can either be specially provided at intervals which would not interrupt the spacing of the root zone tubes or can be provided by simply periodically elevating a loop which could otherwise be used as a root zone tube.

It has been found that it is preferable that tubes 23 be spaced from each other by a distance which ranges between about 2.5 centimeters (1.0 inches) to about 7.6 centimeters (3.0 inches). At the close spacing end of this range, the array is particularly well suited for cold climate applications in which very substantial heat loss in the greenhouse can be expected. Closer spacing, however, will cause cost per square foot of array to increase much more rapidly than the advantages of root heating can justify. Spacing much beyond 7.6 centimeters (3 inches) requires that the tubes be run at a water temperature which is undesirably elevated and can locally inhibit plant growth, as well as requiring auxiliary support racks when small containers are employed.

In order to withstand the high temperatures which are sometimes encountered and further to be able to withstand the corrosive chemicals found in fluid sources such as geothermal waters, it is preferable and highly advantageous to form the tubes 23 of the present invention of elastomeric terpolymers of ethylene, propylene, diene monomer (EPDM). The EPDM plastic tubes can withstand temperatures in the range of −50° F. to +300° F., and they are not corroded by extreme salts or brines of the type found in solar ponds and geothermal water. Moreover and very importantly, the EPDM plastic tubes are flexible enabling them to conform to the periphery of containers or be elevated and used as space heaters. The twin tube polyethylene tubes do not have the necessary flexibility.

In the apparatus of the present invention it is preferable to employ relatively small diameter tubes 23. Thus, the tubes will have an outside diameter in the range of about 1.0 to about 0.60 centimeter, with an inside diameter of about 0.75 to about 0.40 centimeters. Headers 21 and 23 are larger in diameter, typically, about 2.5 centimeters internal diameter, and may be formed of EPDM or other corrosion and temperature resistant plastics. Since flexibility of the manifolds is not important, some greater latitude in selecting the manifold material is possible.

In order to bleed air from the system during start-up, vent means 36 and 37 can be provided in headers 21 and 22, respectively. These vents can be provided as fittings in the manifold pipes having capped ends which can be removed during the bleeding operation.

Referring now to FIGS. 4, 5 and 6, the micro-climate temperature control apparatus of the present invention is shown as mounted in an array, generally designated 41, in which individual heat transfer tubes 42 are held in place in the array by a plurality of securement or spacer strips, generally designated 43. Plants or containers 45 for plants (shown in phantom) are positioned above array 41 in a manner as set forth with FIGS. 1 through 3. As best may be seen in FIGS. 5 and 6, securement strip 43 has a T-shaped cross-section and includes a central upstanding flange 52 formed with a plurality of side-by-side tube receiving and retaining notches 44, each preferably formed with an outwardly facing mouth portion 46, converging to a throat portion 47 having a width dimension less than the diameter of tubes 42, and forming the entry to enlarged socket portion 48. Socket portion 48 of notches 44 is dimensioned to have a diameter substantially equal to the diameter of heat transfer tubes 42 so that the flexibly resilient tubes can be urged past throat 47 and into press-fit relation with sockets 48. A slight interference fit between sockets 48 and tubes 42 is preferable as long as the interference fit does not materially restrict the flow of heat transfer fluid in the tubes.

In order to enable securement of strips 43 in any desired location, and further in order to enable flexure of the securement strips about three mutually perpendicular axes, it is preferable that strips 43 be formed with openings, and preferably slots 49, dimensioned to receive fasteners therethrough. Slots 49 are provided in which the edges of laterally extending flanges 51 which project from either side of the central upwardly projecting flange 52 in which notches 44 are formed. One purpose of slots 49 is to enable fasteners 53 to be used to secure the strips to a supporting surface 54. Additionally, however, the slots 49 enable bending of the strip about a vertical axis, as best may be seen in FIG. 4 in connection with strip 43a. Thus, while flanges 51 provide lateral stability to the strip, slots 49 in flanges 51 enable bending of the securement strips to accommodate a wide variety of tube array configurations. Additionally, as will best be seen from FIG. 6, notches 44 in upstanding flange 52 enable bending of the strip about a horizontal axis so that the strip can be secured to curved surfaces, as well as planar surfaces. It is even possible to twist the strip about an axis extending longitudinally with the strip if required. Thus, formation of strip 43 from a flexible plastic, in combination with the notches and slots, affords a strip which has a universal flexibility enabling its use to secure tubes to a wide variety of surfaces.

As also will be apparent from FIG. 6, the notches 44 will retain tubes 42 therein even if the securement strip is inverted. In some applications it is advantageous to use securement strips 43 to secure the tube array underneath a bench or support surface 54 with the plants being positioned on top of the support surface. Alternatively, strips 43 can be secured on a surface above the plants with selected tubes being vertically displaced, as shown in FIG. 2, and secured in an elevated position above the array and proximate the plant foliage by securement strips fastened to the underneath surface of a shelf, support bracket or the like above the plants.

In the preferred form, securement strips 43 are formed with complementary ends in which one of the strips includes a tongue portion 56 which mates with a groove 57 in the end of the adjacent strip. The strips can therefore be easily joined in end-to-end relation by sliding the tongue 56 transversely into groove 57.

It is a further feature of the present invention that the inlet manifold 61 and outlet manifold 62 can be formed with an overall length, L, which is substantially less than the transverse width, W, of array 41. Spacer strips 43 are particularly well suited for fanning-out the array of tubes from relatively short or stubby manifolds to an array having a very substantial width, W. As may be seen in FIG. 4, there is no need for the inlet and outlet manifolds to extend over the full width dimension of the array, as is shown in FIG. 1. Instead, each of the tubes can be coupled to stubby manifolds and then transversely spread or displaced and held in place by securement strip 43. This saves cost in connection with manifold material, which is often formed of a very high temperature resistant and more costly plastic, and it keeps isles between benches free of headers to enable access to the plants.

As used herein, the expression "relatively short" shall mean a length which is no greater than about ½ width dimension of the array.

What is claimed is:

1. In a micro-climate temperature control apparatus for heating or cooling of plants including input manifold means, outlet manifold means, and an array of a plurality of heat transfer fluid conveying tubes each coupled to said input manifold means and said outlet manifold means for the flow of a heat transfer fluid therethrough, said tubes being formed of a flexible self-supporting plastic material, adjacent tubes in said array being relatively spaced apart and said tubes being positioned adjacent to growing plants, and said tubes being independently movable over substantially the entire lengths thereof, the improvement in said micro-climate temperature control apparatus comprising:

elongated securement strip formed with a plurality of side-by-side tube receiving and retaining notches formed for and having said tubes removably mounted in press-fit relation in said notches.

2. The micro-climate temperature control apparatus as defined in claim 1 wherein, said strip is formed of a flexible material and is further formed for universal flexure about three mutually perpendicular axes.

3. The micro-climate temperature control apparatus as defined in claim 2 wherein, said strip includes slot means formed for securement of said strip to a support surface and formed to enable lateral flexure of said strip about a vertical axis.

4. The micro-climate temperature control apparatus as defined in claim 1 wherein,
said notches are each defined by an outwardly facing mouth portion converging to a throat portion having a width dimension less than the diameter of said tubes and an enlarged socket portion dimensioned to receive said tubes therein.

5. The micro-climate temperature control apparatus as defined in claim 1, and
said manifold means each have an overall length less than the width dimension of said array,
securement strip means secured to a support surface and formed to extend across substantially the entire width of said array proximate said manifold means, and
said tubes being laterally spread between said manifold means and said securement strip and secured in and mounted to said securement strip.

6. A micro-climate temperature control apparatus for the heating or cooling of plants including input manifold means, outlet manifold means, and an array of a plurality of heat transfer fluid conveying tubes each coupled to said input manifold means and said outlet manifold means for the flow of heat transfer fluid therethrough, wherein the improvement in said apparatus comprises:
securement strip means formed with a plurality of side-by-side tube receiving and retaining notches,
said tubes being formed of a flexible self-supporting plastic material and being independently movable and positioned in relatively spaced apart relation over substantially their entire lengths and being removably mounted to said strip means and retained in spaced apart relation by said notches in said strip means.

7. The micro-climate temperature control apparatus as defined in claim 6 wherein,
said securement strip means is formed of a flexible material and is formed for universal flexure about three mutually perpendicular axes.

8. The micro-climate temperature control apparatus as defined in claim 6 wherein,
said securement strip means is formed with a T-shaped cross-section with the upstanding flange of said securement strip means being formed with said notches and laterally extending flanges on either side of said upstanding flange being formed with openings therein dimensioned to receive fasteners for securement of said securement strip means to a support surface.

9. The micro-climate temperature control apparatus as defined in claim 6 wherein,
said notches are each defined by an outwardly facing mouth portion converging to a throat portion having width dimension less than the diameter of said tubes, and
said notches further include an enlarged socket portion inwardly of said throat portion dimensioned to have substantially the same diameter as said tubes.

10. The micro-climate temperature control apparatus as defined in claim 6 wherein,
said array has a width dimension equal to the sum of the lateral spacing between said tubes,
said input manifold means and said outlet manifold means both along said width dimension proximate an end of said array a distance substantially less than said width dimension of said array,
said strip means extends transverse of said tubes along said width dimension a distance substantially equal to said width dimension, and
said tubes are framed-out laterally from said input manifold means and said outlet manifold means to the full width dimension of said array.

* * * * *